United States Patent [19]

Faroudja

[11] Patent Number: 5,151,783
[45] Date of Patent: Sep. 29, 1992

[54] DIGITAL TELEVISION WITH ENHANCEMENT

[76] Inventor: Yves C. Faroudja, 26595 Anacapa Dr., Los Altos Hills, Calif. 94022

[21] Appl. No.: 710,823

[22] Filed: Jun. 5, 1991

[51] Int. Cl.⁵ .............................................. H04N 7/13
[52] U.S. Cl. ................................... 358/133; 358/141; 358/188
[58] Field of Search ........................ 358/133, 141, 188

[56] References Cited

U.S. PATENT DOCUMENTS

| | | | |
|---|---|---|---|
| 2,851,522 | 9/1958 | Hollywood | 358/166 |
| 4,030,121 | 6/1977 | Faroudja | 358/37 |
| 4,262,304 | 4/1981 | Faroudja | 358/37 |
| 4,504,853 | 3/1985 | Faroudja | 358/37 |
| 4,847,681 | 7/1989 | Faroudja | 358/37 |
| 4,951,149 | 8/1990 | Faroudja | 358/230 |
| 4,989,090 | 1/1991 | Campbell | 358/140 |
| 5,014,119 | 5/1991 | Faroudja | 358/37 |
| 5,025,312 | 6/1991 | Faroudja | 358/36 |

OTHER PUBLICATIONS

Paper, S. Aikoh et al. NTV, "A New System of NTSC-Compatible Wide Aspect Advanced Television", NAB, Las Vegas, Nev., May, 1991.
Submission to FCC by Advanced Television Research Consortium "Advanced Digital Television System Description" Feb. 27, 1991.
Paper, D. Le Gaill, MPEG, "The MPEG Video Compression Algorithm: A Review" SPIE/IS&T Symposium, San Jose, Calif. Feb. 28, 1991.
Submission, Advanced Television Research Program, "ATVA-Progressive System" Feb., 1991.
Technical Description, "Digital Spectrum Compatible HDTV System", Zenith and AT&T, Feb. 22, 1991.

Primary Examiner—Howard W. Britton

[57] ABSTRACT

A single-ended, digital, enhanced resolution television system includes a digital encoder and modulator, a limited bandwidth medium, such as a conventional 6 MHz wide television channel or a magnetic recording medium for passing or storing the digital modulation; and a digital decoder including single-ended resolution enhancement processes for enhancing resultant picture quality at a display device to an enhanced resolution level.

30 Claims, 4 Drawing Sheets

16 QAM

QPSK

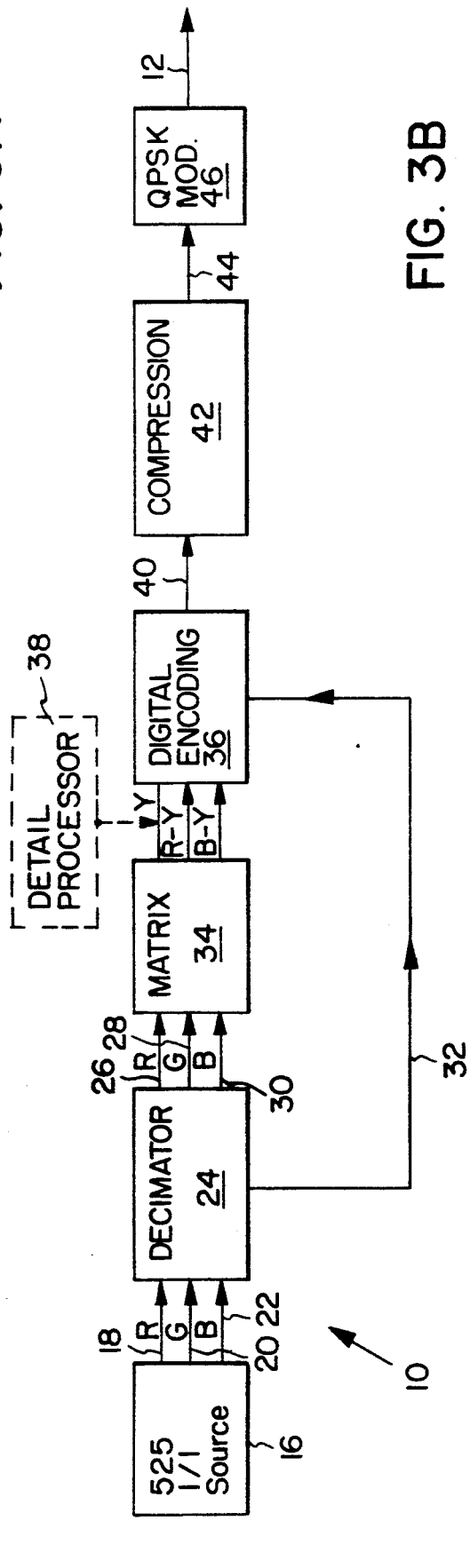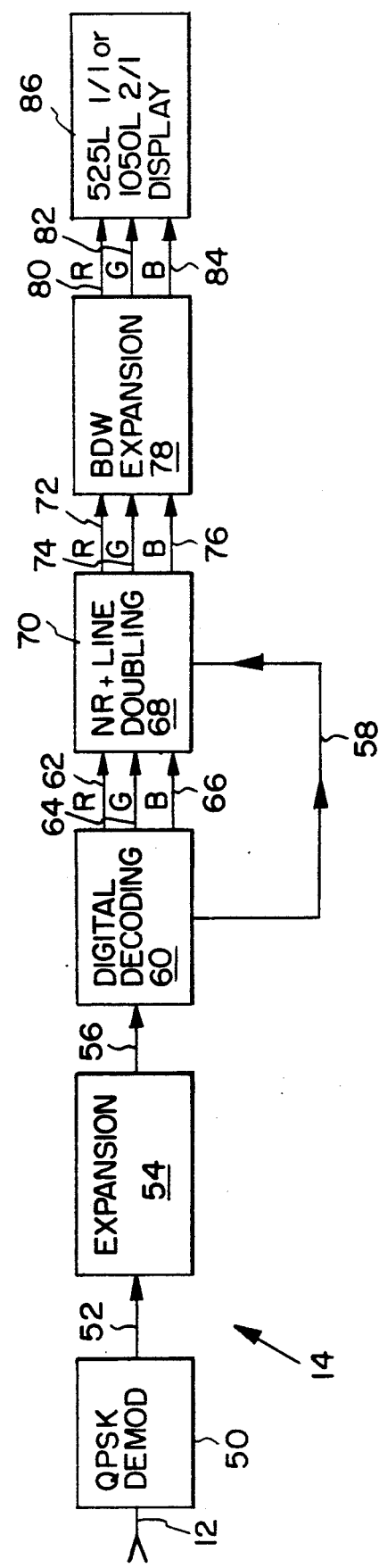

DIGITAL TELEVISION WITH ENHANCEMENT

FIELD OF THE INVENTION

The present invention relates to television signal processing systems. More specifically, the present invention relates to a digital television system for a limited bandwidth medium and achieving high definition picture quality by use of non-cooperative picture enhancement processes at the receiver/display.

BACKGROUND OF THE INVENTION

Recent proposals for high definition television systems ("HDTV") have specified digital transmission techniques. By "digital" is meant that the signal is digitized for passage through a limited bandwidth medium, such as a broadcast channel, or a storage medium, such as tape or disk. It is apparent from the state of the art, that the next generation of television standards will specify that the transmission/storage medium will contain digital, as opposed to analog, modulation. In fact, the present inventor predicted publicly in 1986–1987 that any proposed HDTV scheme not compatible with the widespread existing analog standards (NTSC or PAL, for example) would necessarily employ digital transmission or storage technology.

The drawback with a fully digital television signal format is very simple to state: the bandwidth required for HDTV is very, very high, in excess of approximately 500 megabits per second for a 1050 line by 1500 pixel image array, wherein the picture frame rate is 30 Hz, and each pixel is quantized with eight bits (256 levels).

Since the picture image statistically includes redundant information from frame to frame, existing data compression techniques have been shown to reduce the amount of raw data to a level in the range of 17 to 20 megabits per second, without perceptible degradation of the picture image. Unfortunately, if simple, robust modulation schemes are employed, the bandwidth of a raw data stream of 17–20 megabits per second is well above the typical bandwidth allocated for television transmission (and available for practical recording, particularly in the consumer electronics VCR field).

For example, the regulatory agencies, such as the United States Federal Communications Commission, have decreed that any digital HDTV system must include a digital modulation spectrum capable of fitting into currently available channel spaces left unoccupied under the current NTSC scheme (the so-called "taboo" channels.) For example, in a metropolitan area, if channels 2 and 4 are allocated, channel 3 is left unoccupied as a taboo channel. The digital HDTV signal is to be transmitted as a simulcast with adjacent conventional analog modulated channels and may not interfere with those channels. Thus, any modulation scheme for digital HDTV must stay within the nominal 6 MHz channel bandwidth, and must be transmitted at low power levels and without causing interference to the existing adjacent analog NTSC service channels.

One proposed modulation scheme for digital HDTV is quadrature amplitude modulation. With this scheme, a carrier, often located in the middle of the channel, is modulated in two ways by the data. A first manner of modulation is amplitude: i.e. a choice of amplitude levels is available to code the data. For example, with 16 QAM, two amplitude levels and a sign is available for four different positions. A second manner of modulation is phase modulation: i.e., the carrier changes phase in relation to the data.

FIG. 1 presents a vectorial representation of phase angle and amplitude of the carrier in the case of 16 QAM modulation, wherein 16 different locations are available for the carrier in the phase/amplitude plane shown in FIG. 1. In this example of 16 QAM, the transmission efficiency is about four bits per hertz. Put another way, 24 megabits of information may be carried by modulation contained within a 6 MHz bandwidth of contiguous spectrum. This scheme nominally fits the requirement that the digital HDTV signal fit within the existing TV channel allocation spaces of the taboo channels. Unfortunately, there are some severe drawbacks with this "high density" modulation scheme.

The 16 QAM system is very sensitive to transmission path deficiencies, such as random noise. If a random noise impulse vector NV of a given amplitude is added to a bit vector BV, a resultant at the receiver will cause the bit to be erroneously decoded as another bit. One proposed answer to this error condition is to front end load the digital signal stream with error correction code syndromes which work with error correction circuitry at the receiver to detect, locate and correct burst errors. These schemes are very complicated.

Another, and even more severe problem arises with multi-path (ghosts). The phase shifted ghost signal will cause vector summing at the receiver leading to widespread errors, and general breakdown of the received digital picture.

While these newly proposed systems are called "fully digital", in reality they are subject to the deficiencies of natural analog paths, either transmission or recording, and given the amount of information needed to provide enhanced picture resolution or "high definition", these systems are not very robust in the face of natural channel degradation. In the case of 16 QAM, the digital positions are simply too close together. Advantages achieved in picture resolution are offset by disadvantages of the high density modulation schemes which fare very poorly when passed through condition-degraded analog channels, such as broadcast or recording. In fact, a digital signal may break down completely in the presence of severe multi-path interference, while a conventional analog NTSC signal will result in a coherent, yet low quality picture image on the receiver display.

The state of the art of HDTV is that the effectiveness of a proposed system is measured by comparing the received signal at the display with the signal at the origination point. Such comparisons of signal details in response to a variety of test stimuli may be made with technical and scientific accuracy. Unfortunately, such comparisons shed very little light upon the aesthetic aspects of picture quality, and the practical realities of television usage.

The newly proposed digital HDTV systems typically call for cooperative processes at the encode and decode ends of the path. For example, data compression and data expansion are usually described as symmetrical or complementary processes (i.e. "cooperative"). One example of the prior art is the one proposed by the Motion Picture Expert Group, which proposes using similar circuitries for data compression as are used for data decompression: essentially symmetrical or cooperative processes.

Television displays are typically found in the home. Even the largest television receivers must fit through existing doors found in the home, and thus be not significantly wider than about 30–40 inches. Television display screens are typically viewed at a viewing distance of 8–12 feet in the home. Given these constraints, and given the limitations of the eye-brain perception process (sometimes referred to as the "human visual process"), it is not absolutely necessary to transmit very wide band information. For viewers' satisfaction, only the illusion or the appearance of a high definition television picture image may be provided without a requirement that the degrading medium accommodate high density digital modulation, such as the 16 QAM approach.

Thus, a hitherto unsolved need has been for an improved television system which advantageously combines the best aspects of digital signal format and signal processes in order to improve upon existing channel allocations.

SUMMARY OF THE INVENTION WITH OBJECTS

A general object of the present invention is to provide a robust, digital television system which achieves the aesthetic visual appearance of high definition television while providing increased immunity to path degrading conditions.

One more general object of the present invention is to provide a digital television signal format which may be contained in modulation schemes and bandwidths of conventional analog television channels and may be improved with single-ended, non-cooperative signal processing techniques to create an appearance of high definition television at the display.

Yet another general object of the present invention is to provide a digital television system wherein a reasonably low number of scanning lines are digitized and sent through a limited bandwidth medium to a receiver which then applies non-symmetrical, single ended picture signal enhancement techniques to achieve a picture display which aesthetically and subjectively manifests to the visual perception process the same picture quality as a true high definition digital television signal.

In accordance with principles of the present invention, a television system includes a digital encoder and modulator, a limited bandwidth medium, such as a conventional 6 MHz wide television channel or a magnetic recording medium for passing or storing the digital modulation; and a digital decoder including single-ended, non-cooperative resolution enhancement processes.

The encoder includes a digital picture source, such as a high resolution camera and a decimator/scan converter, a color matrix, an optional picture detail processor for enhancing low level details in a luminance path, and a digital encoder for converting the electrical television picture image signal into a stream of digital values representing picture element signals at a recurrent picture frame rate, the digital values representing samples of the picture information at a predetermined sampling rate lying in a range between 11 and 12 megahertz.

The encoder also includes a data compressor for compressing the stream of digital values to a rate of approximately six megabits per second. The digital modulator translates the compressed stream of digital values into carrier modulation contained within a spectral modulation bandwidth not substantially in excess of 6 MHz so that it may pass through the limited bandwidth medium.

The decoder is connected to the limited bandwidth medium for receiving and detecting the carrier modulation. The decoder includes a digital demodulator for demodulating the received modulation into a stream of received compressed digital values; a digital expander operating in a compatible manner with the compressor for expanding the received compressed digital values into received expanded values, and a single-ended, non-cooperative picture resolution enhancement processing circuit for processing the received expanded digital values into resolution enhanced digital picture values for display upon an enhanced resolution display connected to receive the enhanced digital picture values.

In one aspect of the present invention the digital modulator and demodulator respectively generate and detect quadrature phase shift keyed (QPSK) carrier modulation contained within a spectral modulation bandwidth not substantially in excess of 6 MHz.

In another aspect of the present invention, the single-ended, non-cooperative picture resolution enhancement processing circuit comprises a scan line doubler optionally including a noise reducer, or a non-linear, multiplicative, harmonic generation and enhancement circuit for generating and combining harmonic functions of picture signal transitions to the received expanded digital values in a controlled manner in order to enhance apparent resolution at the enhanced resolution display, or both. In this aspect of the invention, the harmonic generation and enhancement circuit may operate in either or both the horizontal dimension or vertical dimension of the picture spatial domain.

In another aspect of the present invention, the encoder may include a signal preprocessor for preprocessing the electrical television picture image signal before it is converted into a stream of digital values. In this aspect of the invention, the preprocessor may include a picture image detail processor for processing spatial domain details of the electrical television picture image signal.

In a further aspect of the present invention, the encoder may include a high definition television camera and a scan conversion decimator for reducing a number of scan lines by a predetermined ratio. In this aspect, the decimator may include a vertical/temporal augmentation signal extractor for extracting and putting out a vertical augmentation signal which is used by the single-ended picture resolution enhancement processing circuit of the decoder to augment processing of the received expanded digital values into resolution enhanced digital picture values.

In one more aspect of the present invention the limited bandwidth medium comprises a television broadcast channel allocated to transmission of the digital modulation, and there is another channel carrying an electrical television picture image signal in a predetermined conventional analog signal format. In this aspect, the decoder includes a conventional analog decoder for decoding signal in conventional format, and a switch for switching the input of the single-ended picture resolution enhancement processing circuit between the digital expansion circuit of the digital decoder and the conventional analog decoder.

These and other objects, advantages, aspects and features of the present invention will be more fully understood and appreciated by those skilled in the art upon consideration of the following detailed description of a preferred embodiment, presented in conjunction with the accompanying drawings.

BRIEF DESCRIPTION OF THE DRAWINGS

In the drawings:

FIGS. 3A and 3B comprise a block diagram of an exemplary television system in accordance with the principles of the present invention, FIG. 3A showing the digital encoder and limited bandwidth path, and FIG. 3B showing the digital decoder and limited bandwidth path.

DETAILED DESCRIPTION OF A PREFERRED EMBODIMENT

In order to represent an improvement over the existing analog television system, a digital system must be robust. That is to say, the sensitivity of the carrier to multi-path interference (ghosts), transmission path noise, and other non-random interferences, has to be extremely high, higher than the existing analog system, in order to justify the considerable expense and effort needed to supplant the existing system with a digital system.

Figure 1:
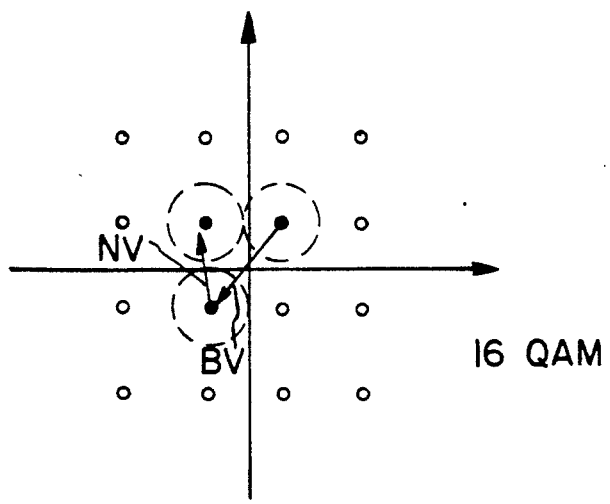
FIG. 1 is a graph of carrier phase angle and amplitude for a high density 16 QAM digital modulation scheme.
Figure 2:
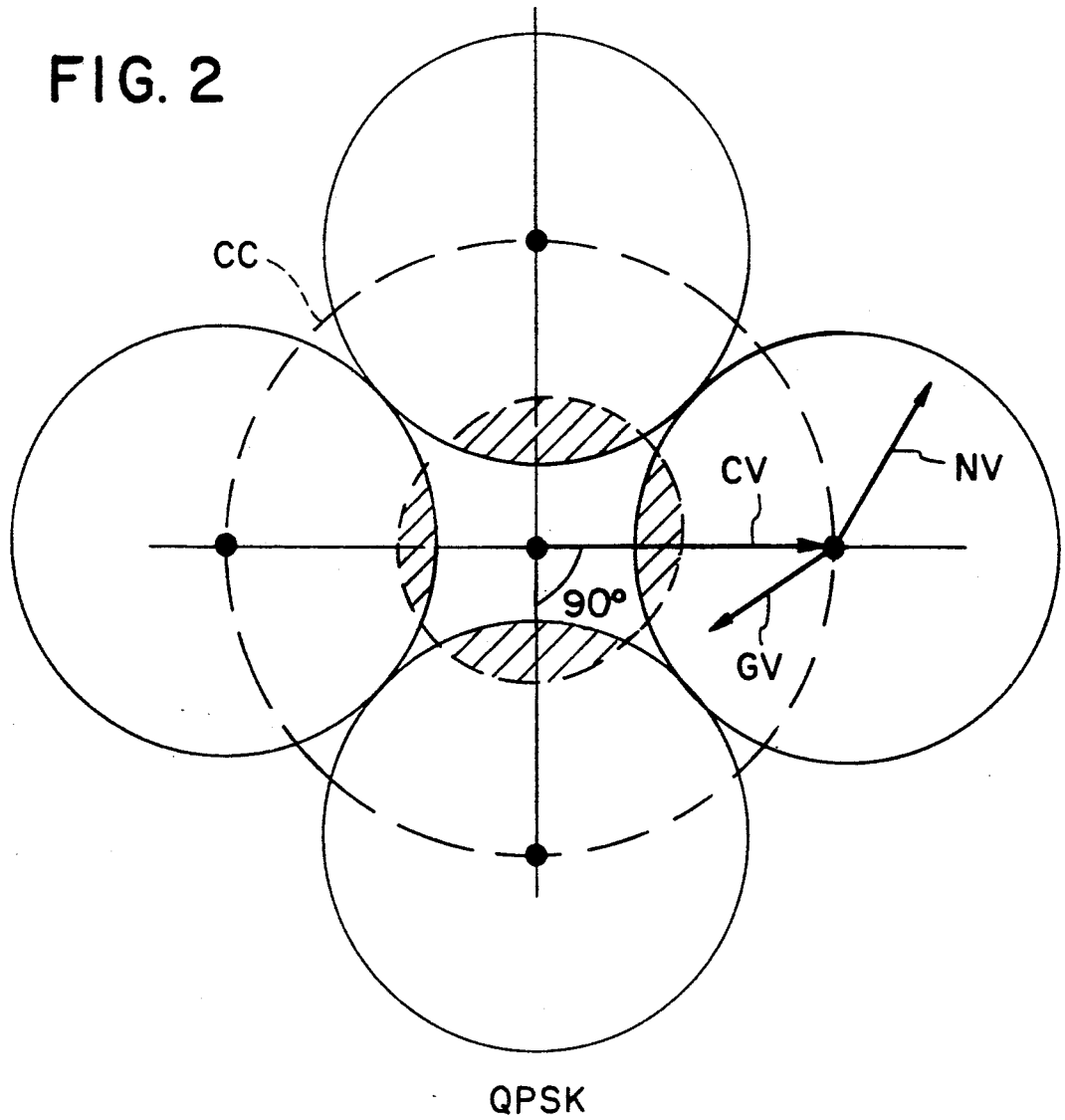
FIG. 2 is a graph of carrier phase angle and amplitude for a medium density QPSK digital modulation scheme employed by way of example in the present invention.

FIG. 2 represents a phase and amplitude plane for a QPSK digital modulation signal. If one views the plane, it defines a locus of a circle. The carrier may be placed anywhere along the carrier circle CC, and the radius of the circle represents the carrier amplitude.

The most effective way to operate along the carrier circle CC in order to be insensitive to path degradation is to fill up the space with circles of uncertainties in the most compact way possible, and with the minimum number of circles. (While one could have a digital zero represented by no carrier and a digital one represented by the presence of a carrier, this keyed carrier wave approach is not very efficient because zero and one present an unbalanced modulation: the one is far more robust than the zero. Also, the keying transition conditions may create undesirable sidebands and adjacent channel interferences).

As the number of circles of uncertainty are increased, resistance to multi-path interferences and ghosts goes down dramatically. Ghost reduction demands that there be a limited number of possibilities, and that the limited number of circles of uncertainty be as large as possible. The QPSK format illustrated in FIG. 2 illustrates one presently preferred modulation scheme for implementing the principles of the present invention. In the FIG. 2 QPSK scheme, there are four carrier positions, with a 90 degree angle between each position. The particular phase of the carrier is very easy to recognize, because it is recognized on a long-term basis by virtue of a synchronous clock that defines the instantaneous phase in reference to a nominal or reference phase position. Also, the carrier is always operating at the same amplitude, so the zone of uncertainty of the carrier is, advantageously, a small radius circle centered at zero amplitude.

The FIG. 2 QPSK modulation scheme is not very sensitive to noise. If a noise vector is present which is only about 3 dB below the carrier vector, as shown by the NV, CV vectors in FIG. 2, the QPSK demodulator will not be confused. This scheme is also not sensitive to ghosts. If a ghost image is present e.g. at 6 dB below the carrier level, the ghost vector will not confuse the demodulator.

The shaded overlap portions in FIG. 2 illustrate vector positions where possible decoding mistakes may occur. The way of visualizing the ghost condition is to add the ghost vector GV to the main vector. As long as the ghost vector GV stays within the circle of the main vector, the QPSK demodulator will not be confused. If the ghost vector is 10 dB or 12 dB, which is generally the worst case, the demodulator is never confused, because it is close to zero. So, the exemplary FIG. 2 QPSK modulation scheme is very robust, and does not require application of ghost reduction techniques to enable a digital system to work.

While the digital QPSK scheme illustrated in FIG. 2 is very robust in resisting influences of noise, multi-path or multi-reflection interferences, and other non-random interferences, with filtering and double sideband modulation, only about one bit of digital information is realized per hertz. Thus, for a 6 megahertz channel bandwidth, only about 6 megabits per second of information may be sent and received through this channel. Fortunately, this bandwidth is sufficient for the present invention, and it provides considerably more robustness in the face of interference than is achieved with more dense digital modulation schemes.

An exemplary television system in accordance with the present invention includes an encoder portion 10, a bandwidth-limited signal path 12 which may be either a broadcast channel or a recording medium, and a decoder portion 14. Turning now to FIG. 3A, the encoder 10 includes a source of high definition picture information, such as a 525 line, progressively scanned camera 16. As is conventional, the source 16 generates and puts out a red component on a line 18, a green component on a line 20, and a blue component on a line 22.

The HDTV signal component lines 18, 20 and 22 enter a decimator or scan converter 24 wherein the HDTV signal components are reduced in bandwidth to those of a conventional (e.g. NTSC-like) signal format such as 525 lines with two to one interlace. The conventional format components are put out on lines 26, 28 and 30.

In addition, the decimator 24 generates and puts out a low bandwidth vertical/temporal augmentation signal on a line 32. The vertical/temporal augmentation signal includes sufficient information to improve resolution e.g. by eliminating aliasing artifacts, such as 30 Hz flicker along diagonal transitions, otherwise created by operation of the decimator/scan converter 24 in the process of reducing the number of scanning lines by a ratio of two. The decimator 24, including the vertical/temporal augmentation signal, is conventional and is well described in the prior art. For example, a method including vertical compensation signal generation at the encoder and application at the decoder is described in a paper by S. Aikoh, Y Kimata, M Ishida, T Ito and S. Takayama, Nippon Television Network Corporation, Tokyo Japan, entitled "A New System of NTSC-Compatible Wide Aspect Advanced Television—New NTSC Mode 1.5—, presented at NAB, May, 1991, in Las Vegas, Nev.

Generally speaking, picture sources operating at twice the conventional scanning rate are not very popular with broadcasters. There is a four-times ratio in aperture required, leading to a requirement for much brighter studio lighting conditions. Conventional HDTV cameras are also quite bulky and are not portable, and they typically cost up to four times or more above conventional studio cameras. Accordingly, the HDTV source 16 and the decimator 24 may be replaced as a unit by a conventional 525 line, 60 Hz, two to one interlaced color picture camera, or 525 line, 30 Hz, progressive scan color picture camera.

The 525 line, two to one interlaced, components on the lines 26, 28 and 30 pass into a conventional color matrix circuit 34 which generates and puts out luminance Y, red minus luminance R-Y and blue minus luminance B-Y picture signal components to a digital encoding circuit 36. An optional detail processor 38 may be provided to enhance picture details of e.g. the luminance component Y at no additional cost in terms of signal to noise ratio or bandwidth. The detail processor 38 is most preferably designed and used in accordance with the teachings of the present inventor's prior U.S. Pat. No. 4,262,304 entitled "Low level Signal Booster for Television Transition, and U.S. Pat. No. 4,847,681 entitled "Low Level Television Signal Transition Booster". The disclosures of these two patents are incorporated herein by reference.

The digital encoding circuit 36 receives digital bits representing luminance Y, red minus luminance R-Y, blue minus luminance B-Y components from the matrix 34, and also receives the vertical/temporal augmentation signal on the line 32 from the decimator 24. Audio and other test and augmentation signals may also be added at this point in the system, or they may be carried separately from the video information. At this point, the digital data stream is about two to three times greater than the bandwidth of the channel.

Typically, although not necessarily, the digital sampling rate would be at the CCIR standard of 13.5 MHz, or more preferably at four times the conventional NTSC color subcarrier or 14.3 MHz. (It should be remembered that since this new system is not necessarily tied to an existing standard, such as NTSC or PAL, in broadest form, the sampling rate may be chosen arbitrarily, depending upon the number of scan lines, aspect ratio, frame rate, etc.) In any event, for reasonable picture resolution without aliasing and quantization errors, the sampling rate will line in a range typically between 11 and 17 megahertz. The signals are then combined into a time sequential format and put out from the digital encoder 36 over a serial bit line 40 to a data compressor 42.

The data compressor 42 employs conventional video data compression techniques to reduce the bit stream to 6 megabits per second and put it out on a line 44 to a 6 MHz bandwidth QPSK modulator 46 of conventional design. The QPSK modulator 46 employs a double sideband suppressed carrier format and carries the 6 megabit data stream within the conventionally allotted 6 MHz bandwidth of a taboo channel space, for example. Since the QPSK signal is very robust in the face of transmission path interferences, a lower power level may be employed than with other more dense modulation schemes, thereby reducing even further the likelihood of adjacent channel interference.

The QPSK modulated signal is then put out from the modulator 46 onto the transmission (record) path 12.

FIG. 3B illustrates the decoder 14. The transmission (playback) path 12 enters a QPSK demodulator 50 of complementary design and function as employed by the QPSK modulator 46 within the encoder 10. The demodulated digital data stream is then passed via a path 52 into an expansion circuit 54.

The expansion circuit 54 expands the digital data stream in accordance with an inverse of the data compression algorithm employed by the compression circuit 42 of the encoder 10. The expansion process expands the signal stream into a main serial path 56.

A digital decoder 60 receives the signal stream via the main path 56 and decodes it into a red component on a path 62, a green component on a path 64, and a blue component on a path 66. Also, the digital decoder 60 extracts and puts out the vertical augmentation signal on a separate path 58.

The three R, G, and B picture signal components are then processed in a single-ended, non-cooperative manner by scan line doubling within a line doubler 68. The scan line doubler 68 receives and uses the recovered vertical augmentation signal on the path 58 in order to eliminate the resolution degrading/flicker artifacts discussed above arising within the decimator 24 of the encoder 10.

The scan line doubler 68 may be of very simple implementation and operate solely by interpolating between adjacent scan lines within the spatial domain. More preferably, and with inclusion of field/frame memories, the scan line doubler 68 may implement a temporal median filter of the type described in the present inventor's U.S. Pat. No. 4,989,090 entitled "Television Scan Line Doubler Including Temporal Median Filter".

An optional noise reduction process 70 may be included within and precede the line doubler 68. The noise reduction process 70 may be found to be helpful to reduce residual system noise up to 55 to 60 dB. Often, noise actually emanates from a camera or picture source, and the process 70 will be effective in visibly reducing such noise. A presently preferred implementation for the noise reduction process 70 is found in the present inventor's pending U.S. patent application Ser. No. 07/683,807 filed on Apr. 11, 1991 and entitled "Time Domain Television Noise Reduction System", the disclosure of which is hereby incorporated herein by reference. This referenced application is a continuation-in-part of the present inventor's U.S. Pat. No. 5,025,312 entitled "Motion-Adaptive Video Noise Reduction System Using Recirculation and Coring", the disclosure of which is also incorporated herein by reference. Scan line doubled red, green and blue signal components are put out from the scan line doubler 70 over paths 72, 74 and 76 respectively.

Following the line doubler 70 is a bandwidth expansion circuit 78 which receives the line doubled red, green and blue components over the paths 72, 74 and 76. The bandwidth expansion circuit 78 operates in a non-linear, multiplicative, harmonic generation fashion, typically in the spatial domain, in order to enhance (shorten) horizontal and vertical transitions.

Figure 5:
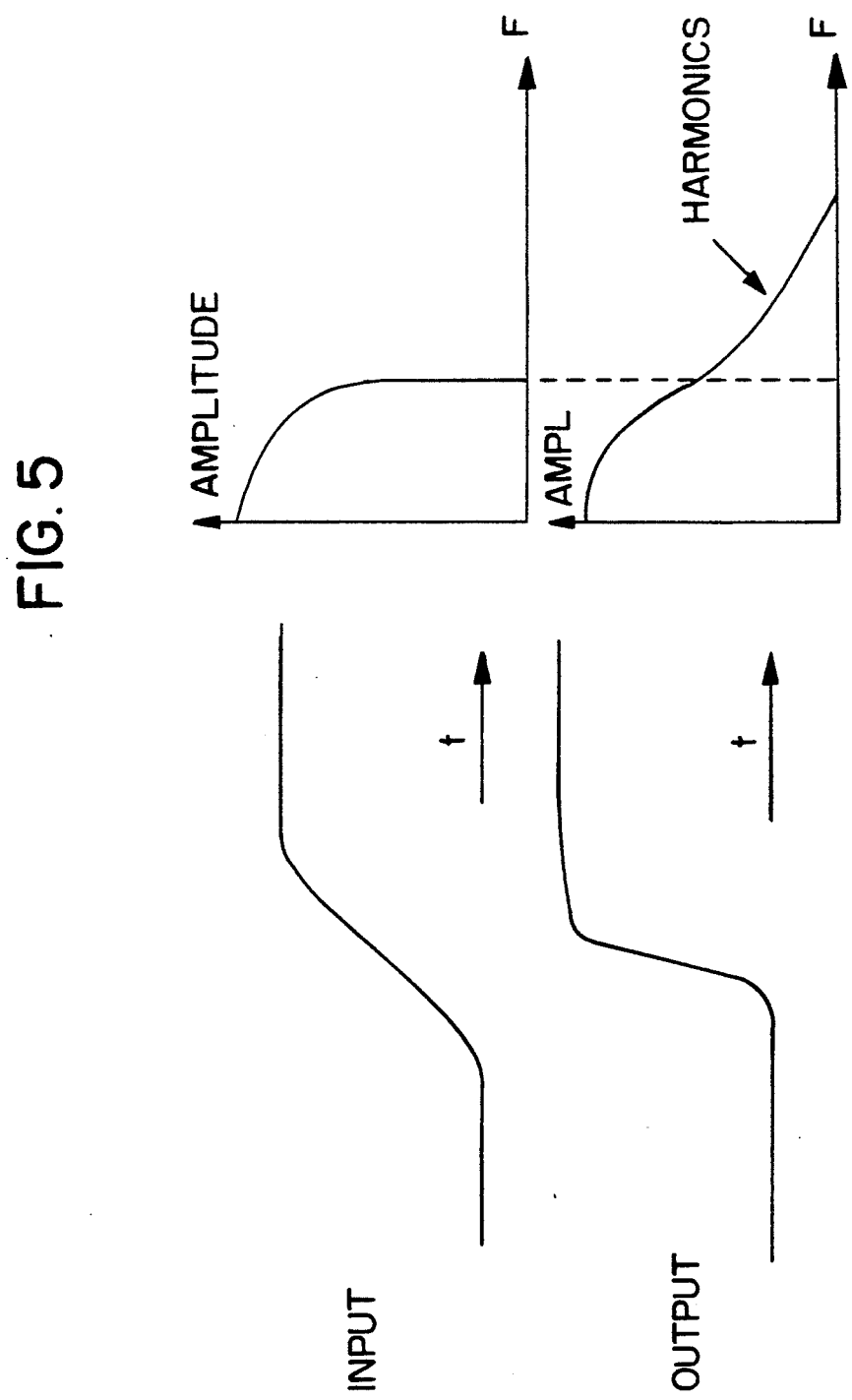
FIG. 5 provides input and output graphs showing rise-time reduction through controlled harmonics generation and resulting bandwidth expansion of a video transition.

Non-linear enhancement techniques are extremely effective in reducing transitional rise times and increasing the apparent sharpness of the display. A general principle of these techniques is to generate harmonics of the signal in a controlled fashion in order to extend its spectrum (see FIG. 5) and therefore reduce its rise time.

The methods used to generate harmonics vary. In the horizontal domain, one approach was suggested by Hollywood in U.S. Pat. No. 2,851,522. Another approach was to generate a second differential of the signal and gate it through a narrow zone having the width of the desired rise time and centered around the transition to be enhanced.

Examples of non-linear signal enhancement techniques are found in the present inventor's prior U.S. Pat. No. 4,030,121 entitled "Video Crispener"; U.S. Pat. No. 4,504,853 entitled "Enhancement of Quadrature Modulated Chroma by Luminance or Chroma Transitions Without Chroma Demodulation"; and, U.S. Pat. No. 5,014,119 entitled "Horizontal and Vertical Transition Level Enhancement Within Television System". The disclosures of these patents are incorporated herein by reference. Similar techniques are useable in the vertical domain. More particularly, the approach which consists of gating a vertically differentiated function of the video signal around the vertical transition has been found to be effective.

Line doubled, bandwidth enhanced red, green and blue color picture signal components are then respectively sent via paths 80, 82 and 84 to a high resolution picture display 86 which operates in a 525 line one-to-one progressive scan format, or in a 1050 line two-to-one interlaced scan format.

The results obtained within the digital television system described herein are striking. They directly equate to a system in which a conventional camera is connected to the scan line doubler 68 and the bandwidth expansion circuit 78. Subjectively, the picture images obtained from the FIG. 3 digital television system compare favorably with presently existent digital HDTV schemes.

Figure 4:
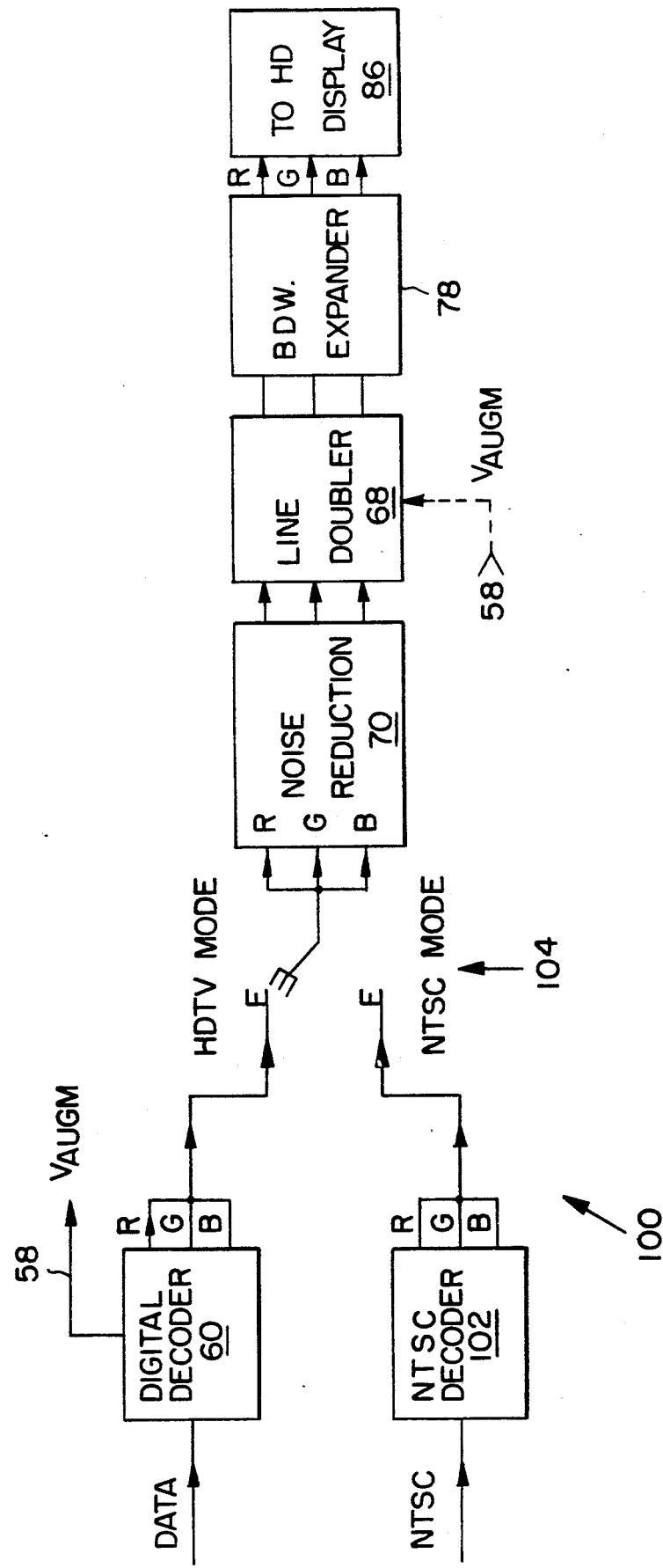
FIG. 4 is a block diagram of an exemplary dual format television receiver which may operate upon conventional analog NTSC picture signals and which may operate within the FIG. 3 system with a minimum of extra circuitry or complexity.

The advantage of employing a conventional 525 scan line, 4/3 aspect ratio signal format becomes even more striking when FIG. 4 is considered. FIG. 4 shows that with such a system, up to about 80 percent of the cost of a dual-format television receiver 100 may be employed for signal processing and display of both the digital signal format and the conventional NTSC signal format.

Turning to FIG. 4, it is seen that the dual-format receiver/display 100 includes in the digital path the digital decoder 60, and in the analog NTSC path a conventional analog NTSC decoder 102. A switch circuit 104 enables the noise reduction circuit input to be switched between outputs of the digital decoder 60 and outputs of the NTSC decoder 102. The switch circuit 104 may be manual, may be linked to a channel selector, and/or may be automatically responsive to the presence of signals at one or the other of the decoders 60 and 102.

Tables 1 and 2 respectively provide examples of numerical values for NTSC and PAL signal formats and along the signal processing chain. These values show how the principles of the present invention are particularly effective within PAL and NTSC signal formats:

TABLE 1

| NTSC Format Non-Cooperative Process | | | | |
| --- | --- | --- | --- | --- |
| Output of | Line Rate | Frame Rate Hz | Interlace | Bandwidth |
| SOURCE | 525 | 30 | 1/1 | 6 MHz |
| DECIMATOR COMPRESSOR/ | 525 | 30 | 2/1 | 6 MHz |

TABLE 1-continued

| NTSC Format Non-Cooperative Process | | | | |
| --- | --- | --- | --- | --- |
| Output of | Line Rate | Frame Rate Hz | Interlace | Bandwidth |
| MODULATOR | 525 | 30 | 2/1 | 6 MHz |
| EXPANDER | 525 | 30 | 2/1 | 6 MHz |
| LINE DOUBLER | 1050 | 30 | 2/1 | 12 MHZ |
| BW EXPANDER | 1050 | 30 | 2/1 | 24 MHZ |

TABLE 2

| PAL Format Non-Cooperative Process | | | | |
| --- | --- | --- | --- | --- |
| Output of | Line Rate | Frame Rate Hz | Interlace | Bandwidth |
| SOURCE | 625 | 25 | 1/1 | 8 MHz |
| DECIMATOR | 625 | 25 | 2/1 | 8 MHz |
| MODULATOR | 625 | 25 | 2/1 | 8 MHz |
| EXPANDER | 625 | 25 | 2/1 | 8 MHz |
| LINE DOUBLER | 1250 | 25 | 2/1 | 16 MHz |
| FRAME DOUBLER | 1250 | 50 | 2/1 | 32 MHz |
| BW EXPANDER | 1250 | 50 | 2/1 | 64 MHz |

Should a 16/9 aspect ratio be desired for some program material simulcast in both digital format and NTSC format, techniques may be employed as described in the present inventor's U.S. Pat. No. 4,951,149 entitled "Television System with Variable Aspect Picture Ratio", the disclosure of which is hereby incorporated by reference.

To those skilled in the art to which the present invention pertains many widely differing embodiments will be suggested by the foregoing without departing from the spirit and scope of the present invention. The descriptions and disclosures herein are intended solely for purposes of illustration and should not be construed as limiting the scope of the present invention which is more particularly pointed out by the following claims.

What is claimed is:

1. A television system comprising:

encoder means including digital picture source means for converting an electrical television picture image signal into a stream of digital values representing picture element signals at a recurrent picture frame rate, the digital values representing samples of the picture information at a predetermined sampling rate, compression means for compressing the stream of digital values, and digital modulation means translating the compressed stream of digital values into carrier modulation contained within a defined spectral modulation bandwidth, the encoder means for communicating the carrier modulation through a limited bandwidth medium means, decoder means connected to the limited bandwidth medium means for receiving and detecting the carrier modulation and comprising:

digital demodulation means for demodulating the received modulation into a stream of received compressed digital values, digital expansion means operating in a compatible manner with the compression means for expanding the received compressed digital values into received expanded values, and single-ended picture resolution enhancement processing means for processing the received expanded digital values into resolution enhanced digital picture values for display upon an enhanced resolution display means connected to receive the enhanced digital picture values.

2. The television system set forth in claim 1 wherein the limited bandwidth medium means comprises a television signal broadcast channel and wherein the improved decoder means is included within a television signal receiving means.

3. The television system set forth in claim 1 wherein the limited bandwidth medium comprises a magnetic storage medium, and wherein the decoder means is included within a television signal playback means for playing the magnetic storage medium.

4. The television system set forth in claim 1 wherein the digital modulation means translates the compressed stream of digital values into quadrature phase shift keyed (QPSK) carrier modulation contained within a spectral modulation bandwidth not substantially in excess of 6 MHz, and wherein the digital demodulation means demodulates the QPSK carrier modulation.

5. The television system set forth in claim 1 wherein the single-ended picture resolution enhancement processing means comprises scan line doubling means and the non-symmetrical picture resolution enhancement processing means comprises non-linear, multiplicative, harmonic generation and enhancement means for generating and combining harmonic functions of picture signal transitions to the received expanded digital values in a controlled manner in order to enhance apparent resolution at the enhanced resolution display means.

6. The television system set forth in claim 1
wherein the limited bandwidth medium means comprises a television broadcast channel allocated to transmission of said modulation, there being another channel carrying an electrical television picture image signal in a predetermined conventional analog signal format
and wherein said decoder means includes conventional analog decoding means for decoding said signal in conventional format, and switch means for switching said non-symmetrical picture resolution enhancement processing means between said digital expansion means and said conventional analog decoding means.

7. The television system set forth in claim 1 wherein the single-ended picture resolution enhancement processing means comprises scan line doubling means.

8. The television system set forth in claim 7 further comprising noise reduction means preceding said scan line doubling means for reducing noise in said received expanded digital values.

9. The television system set forth in claim 1 wherein the scan conversion, decimation means includes resolution augmentation signal extraction means for extracting and putting out a resolution augmentation signal, wherein the digital picture source means includes said resolution augmentation signal within said stream of digital values, and wherein said single-ended picture resolution enhancement processing means of said decoder means receives and employs said resolution augmentation signal in processing the received expanded digital values into resolution enhanced digital picture values.

10. The television system set forth in claim 9 wherein said single-ended picture resolution enhancement processing means comprises scan line doubling means.

11. The television system set forth in claim 1 wherein the single-ended picture resolution enhancement processing means includes non-linear, multiplicative, harmonic generation and enhancement means for generating and combining harmonic functions of picture signal transitions to the received expanded digital values in a controlled manner in order to enhance apparent resolution at the enhanced resolution display means.

12. The television system set forth in claim 11 wherein said non-linear, multiplicative, harmonic generation and enhancement means operates in a horizontal dimension of the spatial domain of the television picture image.

13. The television system set forth in claim 11 wherein said non-linear, multiplicative, harmonic generation and enhancement means operates in a vertical dimension of the spatial domain of the television picture image.

14. The television system set forth in claim 1 wherein the digital picture source of the encoder means comprises preprocessor means for preprocessing the electrical television picture image signal before it is converted into a stream of digital values.

15. The television system set forth in claim 14 wherein the preprocessor means comprises detail processor means for processing spatial domain details of the electrical television picture image signal.

16. The television system set forth in claim 14 wherein the preprocessor means comprises scan conversion, decimation means for reducing a number of scan lines by a predetermined ratio.

17. In a television system comprising encoder means including a source for translating optical picture information into a stream of electrical picture element signals at a recurrent picture frame rate, preprocessor means for generating an auxiliary resolution augmentation signal, digital encoding means for encoding the stream of electrical picture element signals and the auxiliary augmentation signal into a stream of digital values at a predetermined sampling rate lying in a range of approximately 11 to 17 meghertz, compression means for compressing the stream of digital values by a factor of approximately two, and digital modulation means for modulating the compressed stream of digital values within a spectral modulation bandwidth not substantially in excess of 6 MHz, the encoder means for communicating the modulation through a limited bandwidth medium means, an improved decoder means connected to the limited bandwidth medium means for receiving the modulation and comprising:

digital demodulation means for demodulating the received modulation into a stream of received compressed digital values, digital expansion means operating in a compatible manner with the compression means for expanding the received compressed digital values into received expanded digital values, digital decoder means for decoding said received expanded digital values into received picture element values and auxiliary augmentation values, single-ended picture resolution enhancement processing means for processing the received expanded digital values in response to said auxiliary augmentation values into resolution enhanced digital picture values, and enhanced resolution display means connected to receive and display the resolution enhanced digital picture values.

18. The television system set forth in claim 17 wherein said non-linear, multiplicative, harmonic generation and enhancement means operates in a horizontal dimension of the spatial domain of the television picture image.

19. The television system set forth in claim 17 wherein said non-linear, multiplicative, harmonic generation and enhancement means operates in a vertical dimension of the spatial domain of the television picture image.

20. The television system set forth in claim 17 wherein the single-ended picture resolution enhancement processing means comprises scan line doubling means and the non-symmetrical picture resolution enhancement processing means comprises non-linear, multiplicative, harmonic generation and enhancement means for generating and combining harmonic functions of picture signal transitions to the received expanded digital values in a controlled manner in order to enhance apparent resolution at the enhanced resolution display means.

21. A television system including:
video source means for providing a video signal of approximately 525 progressively scanned lines, approximately 30 frames per second, and having a bandwidth limited to approximately 6 megaherts,
decimator means connected to the video source means for creating from said video signal and putting out a decimated video signal of approximately 525 two-to-one interlace scan lines at approximately 60 fields per second and having a bandwidth limited to approximately 6 megahertz, and for generating and putting out a resolution augmentation signal,
digital encoding and compression means connected to said decimator means for encoding and compressing said decimated video signal and for encoding said resolution augmentation signal into an encoded signal,
modulation means connected to said digital encoding and compression means for converting said encoded signal to a modulating signal within a defined modulation scheme having a modulation density not substantially greater than quadrature phase shift keyed modulation (QPSK), said modulation means being arranged to communicate said modulating signal to and through a medium having a bandwidth limited not to exceed approximately 6 megahertz,
demodulation means arranged to receive said modulating signal from said limited bandwidth medium and to demodulate it and put it out as a base band signal in accordance with a demodulation function of said defined modulation scheme,
digital decoding and expansion means for decoding from said demodulation function and expanding a received resolution augmentation signal and a received video signal,
combining and line doubling means connected to said digital decoding and expansion means for combining said received resolution augmentation signal with said received video signal and for doubling the number of scanning lines to obtain a received, scan line doubled signal having a frame rate of approximately 60 hertz, and a bandwidth of approximately 12 megahertz, and
horizontal and vertical bandwidth expansion means connected to receive said scan line doubled signal and to expand the bandwidth thereof by controllably generating and applying harmonics of transitions occurring within said scan line doubled signal.

22. The television system set forth in claim 21 wherein the medium comprises an allocated channel of the spectrum.

23. The television system set forth in claim 21 wherein the medium comprises a data storage medium.

24. A television system including:
video source means for providing a video signal of approximately 625 progressively scanned lines, approximately 50 frames per second, and having a bandwidth limited to approximately 8 megaherts,
decimator means connected to the video source means for creating from said video signal and putting out a decimated video signal of approximately 625 two-to-one interlace scan lines at approximately 50 fields per second and having a bandwidth limited to approximately 8 megahertz, and for generating and putting out a resolution augmentation signal,
digital encoding and compression means connected to said decimator means for encoding and compressing said decimated video signal and for encoding said resolution augmentation signal into an encoded signal,
modulation means connected to said digital encoding and compression means for converting said encoded signal to a modulating signal within a defined modulation scheme having a modulation density not substantially greater than quadrature phase shift keyed modulation (QPSK), said modulation means being arranged to communicate said modulating signal to and through a medium having a bandwidth not to exceed approximately 8 megahertz,
demodulation means arranged to receive said modulating signal from said limited bandwidth medium and to demodulate it and put it out as a base band signal in accordance with a demodulation function of said defined modulation scheme,
digital decoding and expansion means for decoding from said demodulation function and expanding a received resolution augmentation signal and a received video signal,
combining and line doubling means connected to said digital decoding and expansion means for combining said received resolution augmentation signal with said received video signal and for doubling the number of scanning lines to obtain a received, scan line doubled signal having a frame rate of approximately 50 hertz, and a bandwidth of approximately 16 megahertz, and
horizontal and vertical bandwidth expansion means connected to receive said scan line doubled signal and to expand the bandwidth thereof by controllably generating and applying harmonics of transitions occurring within said scan line doubled signal.

25. The television system set forth in claim 24 wherein the medium comprises an allocated channel of the spectrum.

26. The television system set forth in claim 24 wherein the medium comprises a data storage medium.

27. The television system set forth in claim 24 wherein the frame rate is further doubled to be approximately 100 hertz.

28. A dual-standard television receiver/display system comprising:
receiving means for receiving a television signal in one of a plurality of formats from a signal source, first decoding means for decoding the television signal in accordance with a first one of said formats, second decoding means for decoding the television signal in accordance with a second one of said formats, switch means for switching between outputs of said first decoding means and said second decoding means depending upon said formats, scan line doubling means connected to said switch means for putting out a scan line doubled signal from the television signal received from said switch means, bandwidth expansion means connected to the scan line doubling means for receiving and enhancing the bandwidth of said scan line doubled signal by controllably generating and applying harmonics of transitions occurring within said scan line doubled signal and for putting out a bandwidth enhanced scan line doubled television signal, and display means for converting said bandwidth enhanced scan line doubled television signal into a visual display.

29. The dual-standard television receiver/display system set forth in claim 28 wherein the signal source comprises an allocated channel of the spectrum.

30. The dual-standard television receiver/display system set forth in claim 28 wherein the signal source comprises a data storage medium.

* * * * *

UNITED STATES PATENT AND TRADEMARK OFFICE
CERTIFICATE OF CORRECTION

PATENT NO. : 5,151,783
DATED : September 29, 1992
INVENTOR(S) : Yves C. Faroudja It is certified that error appears in the above-indentified patent and that said Letters Patent is hereby corrected as shown below:

Column 13
  Line 21:   "megaherts" should be --megahertz--
Column 14
  Line 10:   "megaherts" should be --megahertz--

Signed and Sealed this

Twenty-ninth Day of March, 1994

Attest:

BRUCE LEHMAN

Attesting Officer      Commissioner of Patents and Trademarks